United States Patent
Das et al.

(10) Patent No.: US 11,588,900 B2
(45) Date of Patent: Feb. 21, 2023

(54) SYSTEMS AND METHODS MULTI-TENANT AND OMNI-CHANNEL ROUTING

(71) Applicant: JPMORGAN CHASE BANK, N.A., New York, NY (US)

(72) Inventors: Deepanjan Das, Hyderabad (IN); Ravi Kappagantu, Hyderabad (IN); Narendra Athota, Hyderabad (IN); Sruthi Parupati, Warangal (IN); Abhilash Pogaku, Hyderabad (IN)

(73) Assignee: JPMORGAN CHASE BANK, N.A., New York, NY (US)

(*) Notice: Subject to any disclaimer, the term of this patent is extended or adjusted under 35 U.S.C. 154(b) by 0 days.

(21) Appl. No.: 17/365,138

(22) Filed: Jul. 1, 2021

(65) Prior Publication Data
US 2022/0046100 A1 Feb. 10, 2022

(30) Foreign Application Priority Data
Jul. 2, 2020 (IN) .............................. 202011028266

(51) Int. Cl.
*H04L 67/148* (2022.01)
*G06Q 30/016* (2023.01)
*G06F 9/54* (2006.01)

(52) U.S. Cl.
CPC ............ *H04L 67/148* (2013.01); *G06F 9/547* (2013.01); *G06Q 30/016* (2013.01)

(58) Field of Classification Search
CPC ...... G06F 9/547; H04L 67/148; G06Q 30/016
See application file for complete search history.

(56) References Cited

U.S. PATENT DOCUMENTS

| | | | | |
|---|---|---|---|---|
| 6,353,406 | B1* | 3/2002 | Lanzl | .................... G01S 13/878 340/8.1 |
| 9,491,297 | B1* | 11/2016 | Kirchhoff | ......... H04M 3/53358 |
| 2003/0174830 | A1* | 9/2003 | Boyer | ..................... H04M 3/56 379/265.13 |
| 2005/0002502 | A1* | 1/2005 | Cloran | .................... G10L 15/00 379/88.18 |
| 2005/0111653 | A1* | 5/2005 | Joyce | .................... H04M 3/523 379/265.09 |
| 2013/0163731 | A1* | 6/2013 | Yan | ........................ H04L 67/02 719/329 |
| 2018/0276395 | A1* | 9/2018 | Bostick | ............... H04L 63/0861 |

* cited by examiner

*Primary Examiner* — Jeong S Park
(74) *Attorney, Agent, or Firm* — Greenberg Traurig LLP

(57) ABSTRACT

Systems and methods for multi-tenant and omni-channel routing are disclosed. In one embodiment, a method for multi-tenant and omni-channel routing may include: (1) a multi-tenant and omni-channel routing computer program executed by an information processing apparatus comprising at least one computer processor receiving, from a first platform in a multi-tenant system, a call to transfer an interaction between the first platform and a third party to a second platform in the multi-tenant system; (2) the multi-tenant and omni-channel routing computer program collecting a context of the interaction from the first platform; (3) the multi-tenant and omni-channel routing computer program identifying the second platform based on the context of the interaction; and (4) the multi-tenant and omni-channel routing computer program routing the interaction to the second platform and communicating the context to the second platform.

18 Claims, 2 Drawing Sheets

SYSTEMS AND METHODS MULTI-TENANT AND OMNI-CHANNEL ROUTING

RELATED APPLICATIONS

This application claims priority to, and the benefit of, Indian Patent Application Number 202011028266, filed Jul. 2, 2020, the disclosure of which is hereby incorporated, by reference, in its entirety.

Field of the Invention

The present disclosure generally relates to systems and methods for multi-tenant and omni-channel routing.

Description of the Related Art

As customer interactions happen across multiple channels (e.g., interactive voice response (IVR), chat, social media, mobile application, website, etc.), each interaction may occur on a different tenant or platform. When these interactions need to move across platforms (e.g., mobile app to IVR to contact center agent), the customer is often required to provide the same information again, which leads to customer dissatisfaction and delays in service.

SUMMARY OF THE INVENTION

Systems and methods for multi-tenant and omni-channel routing are disclosed. In one embodiment, a method for multi-tenant and omni-channel routing may include: (1) a multi-tenant and omni-channel routing computer program executed by an information processing apparatus comprising at least one computer processor receiving, from a first platform in a multi-tenant system, a call to transfer an interaction between the first platform and a third party to a second platform in the multi-tenant system; (2) the multi-tenant and omni-channel routing computer program collecting a context of the interaction from the first platform; (3) the multi-tenant and omni-channel routing computer program identifying the second platform based on the context of the interaction; and (4) the multi-tenant and omni-channel routing computer program routing the interaction to the second platform and communicating the context to the second platform.

In one embodiment, the first platform may provide the interaction over a first communication channel, and the second platform may provide the context over a second communication channel.

In one embodiment, the third party may be a customer.

In one embodiment, the interaction at the first platform may be a first communication type comprising one of an interactive voice response system communication, a chat, a social media communication, and a mobile application communication. The interaction at the second platform may be a second communication type comprising one of an interactive voice response system communication, a chat, a social media communication, and a mobile application communication that is different from the first communication type.

In one embodiment, the first platform and the second platform may have different resources.

In one embodiment, the call may include a REST call.

In one embodiment, the context may include at least one of an identification of the third party, third party account information, and a purpose for the interaction.

In one embodiment, the context may be collected in an open format.

In one embodiment, the method may further include pre-populating desktop screen associated with the second platform with at least some of the context.

According to another embodiment, a system for multi-tenant and omni-channel routing may include: a multi-tenant system comprising a plurality of platforms for hosting interactions with third parties; and a multi-tenant and omni-channel routing computer program executed by an information processing apparatus comprising at least one computer processor. The multi-tenant and omni-channel routing computer program may receive from a first platform, a call to transfer an interaction between the first platform and a third party to a second platform in the multi-tenant system, may collect a context of the interaction from the first platform, may identify the second platform based on the context of the interaction, and may route the interaction to the second platform and communicating the context to the second platform.

In one embodiment, the first platform may provide the interaction over a first communication channel, and the second platform may provide the context over a second communication channel.

In one embodiment, the third party may be a customer.

In one embodiment, the first platform may be a first communication type comprising one of an interactive voice response system communication, a chat, a social media communication, and a mobile application communication. The interaction at the second platform may be a second communication type comprising one of an interactive voice response system communication, a chat, a social media communication, and a mobile application communication that is different from the first communication type.

In one embodiment, the first platform and the second platform may have different resources.

In one embodiment, the call may include a REST call.

In one embodiment, the context may include at least one of an identification of the third party, third party account information, and a purpose for the interaction.

In one embodiment, the context may be collected in an open format.

In one embodiment, the multi-tenant and omni-channel routing computer program may pre-populate a desktop screen associated with the second platform with at least some of the context.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Embodiments are generally directed to systems and methods for multi-tenant and omni-channel routing.

Embodiments provide an open-ended API that can take context data and target channel as inputs, and the context data may be used to make correct routing decision across multiple tenants.

Embodiments may also move context data between interactions and normalize them based on the target platform.

Embodiments may track a customer interaction journey across multiple channels by linking them with a unique identifier.

Figure 1:
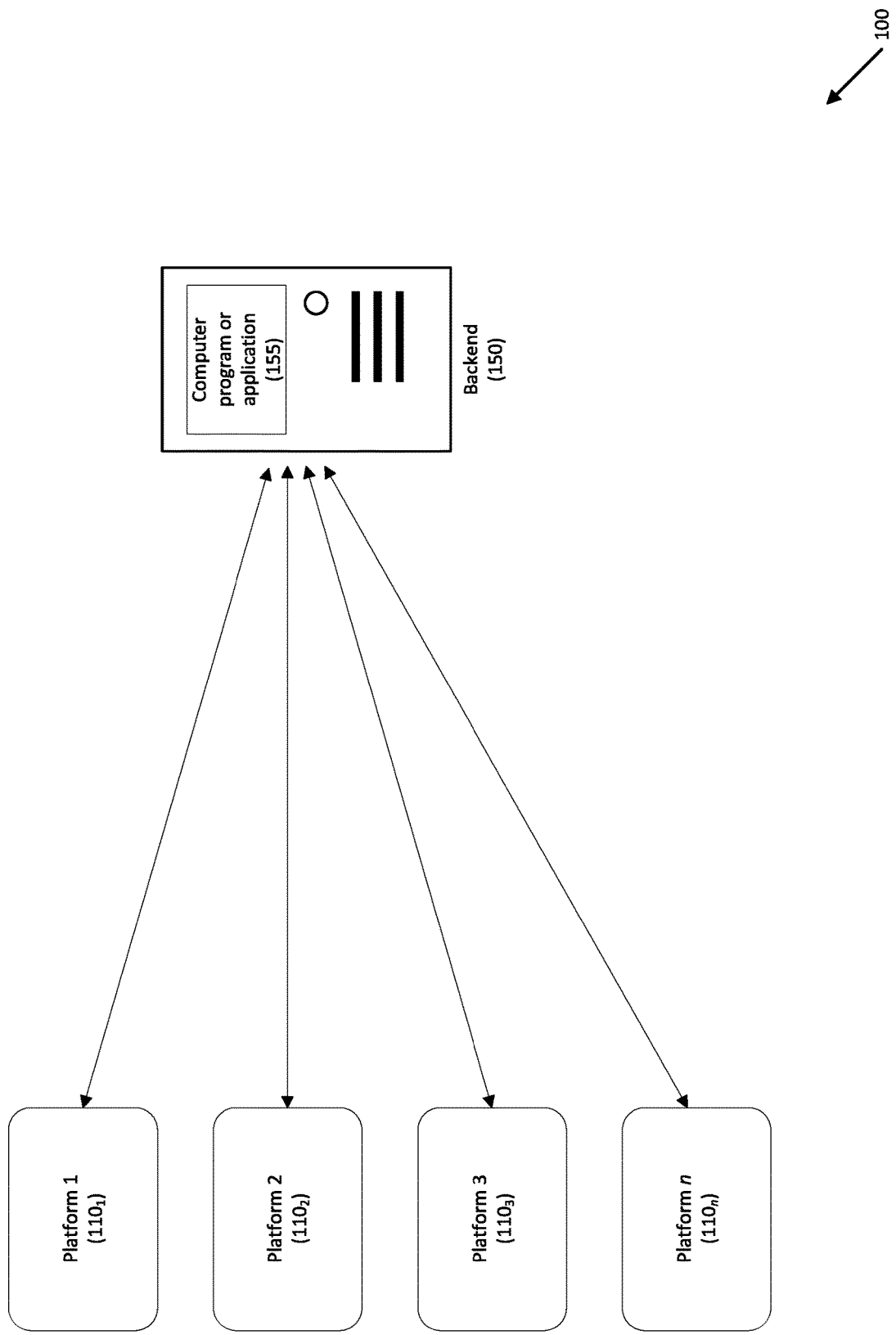
FIG. 1 depicts a system for multi-tenant and omni-channel routing according to one embodiment.

Referring to FIG. 1, a system for multi-tenant and omni-channel routing is disclosed. System 100 may include backend 150 that may execute computer program or application 155 for multi-tenant and omni-channel routing. Backend 150 may include any suitable electronic device, including servers (physical and/or cloud-based), computers, etc.

System 100 may further include a plurality of platforms (e.g., platform $110_1$, platform $110_2$, platform $110_3$, . . . platform $110_n$. Each platform 110 may be a tenant in a multi-tenant system, a separate platform, etc.

In a communications routing embodiment, platform 110 may include IVR, chat, social media, mobile application, website, etc.

Each platform 110 may communicate with computer program or application 155 using any suitable network or combinations of networks.

Each platform 110 may communicate with systems spanned across multiple enterprises.

Figure 2:
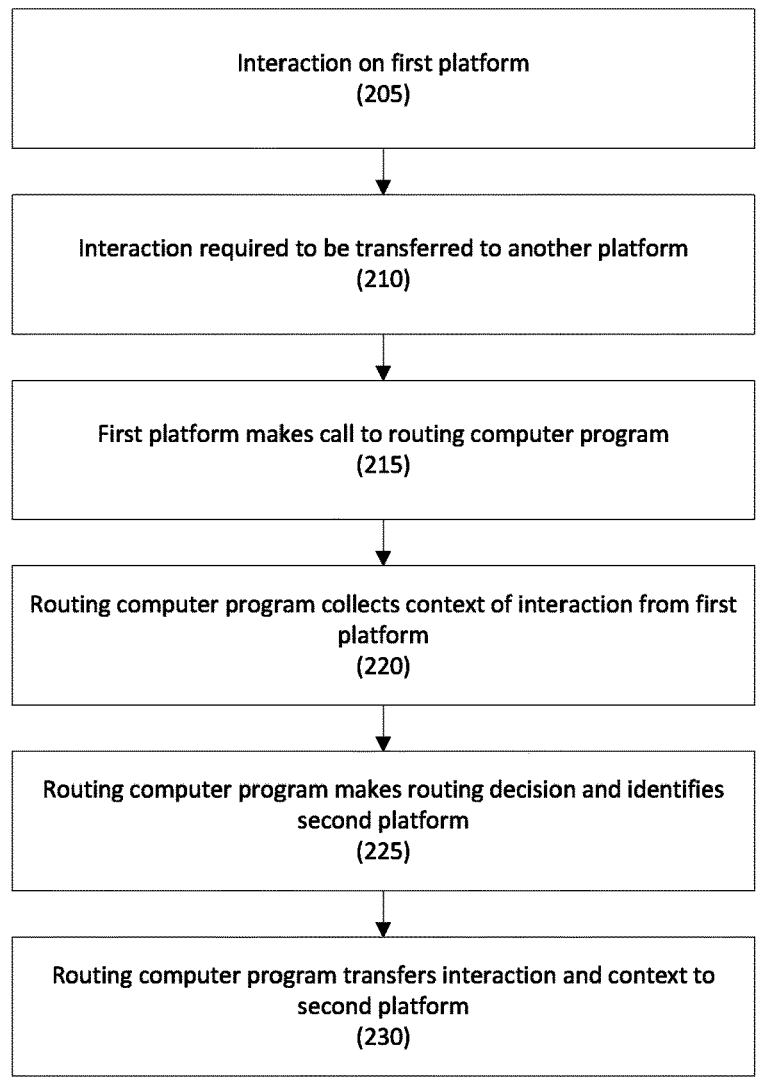
FIG. 2 depicts a method for multi-tenant and omni-channel routing according to one embodiment.

Referring to FIG. 2, a method for multi-tenant and omni-channel routing is provided according to one embodiment.

In step 205, an interaction may occur at a first platform. In one embodiment, the interaction may be a communication (e.g., IVR, chat, social media, mobile application, website, etc.) at the first platform.

In one embodiment, the first platform may be part of a multi-tenant system.

In step 210, the interaction may be required to be transferred to another platform. For example, the interaction may require additional resources that are not provided by the first platform (e.g., the caller may request human interaction, etc.). As another example, a pattern of the interaction may indicate that human assistance is needed (e.g., repetitive menu selections, multiple return to main menu, etc.).

In one embodiment, determination to transfer an interaction may further base based on historical and real-time data in data stores, data lakes, etc. In one embodiment, contextual data may be generated during prior interactions that the customer had across multiple interaction channels. This historical data may be used to train a machine learning model and/or an artificial intelligence model to determine when to transfer an interaction from one channel to another.

In step 215, the first platform may make a call a computer program or application, such as a multi-tenant and omni-channel routing computer program, to facilitate the transfer. In one embodiment, the call may be a REST call.

In step 220, the computer program or application may collect the context of the interaction from the first platform. In one embodiment, the context may depend on the type of interaction. Examples of context that may be collected include participant, account information, purpose for interaction, authentication status, etc. The context may be collected in an open format, such as JSON, XML, etc.

In step 225, the computer program or application may make a routing decision on which platform to transfer the interaction to. For example, the routing decision may be based on business rules, available resources, results of historical routing decisions, etc. For example, embodiments may use a trained machine learning model and/or artificial intelligence mode to determine the platform to which to route the interaction. Thus, historical context data may be leveraged to make routing decision, instead of, or in additional to, using real-time key value pairs. The contextual data may be provided by historical and real-time data stores or data lakes. The use of machine learning and/or artificial intelligence may assess the intent of the interaction. Thus, embodiments may provide more tailored routing for the customer, avoiding repetitive menu selections and return to main menus.

In step 230, the computer program or application may route the interaction to the identified platform. The computer program or application may transfer to the context to the identified platform. In one embodiment, if being transferred to a human agent, the computer program or application may pre-populate the human agent's desktop screen with the appropriate information from the context.

It should be recognized that although several different embodiments are disclosed, these embodiments are not exclusive. Thus, although certain features may be disclosed in the context of one embodiment, the features may be used any embodiment as is necessary and/or desired.

Hereinafter, general aspects of implementation of the systems and methods of the embodiments will be described.

The system of the embodiments or portions of the system of the embodiments may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the embodiments.

The processing machine used to implement the embodiments may utilize a suitable operating system.

It is appreciated that in order to practice the methods as described above, it is not necessary that the processors and/or the memories of the processing machine be physically located in the same geographical place. That is, each of the processors and the memories used by the processing machine may be located in geographically distinct locations and connected so as to communicate in any suitable manner.

Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment, be performed by a single component. Further, the processing performed by one distinct component as described above may be performed by two distinct components. In a similar manner, the memory storage performed by two distinct memory portions as described above may, in accordance with a further embodiment, be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of the embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the embodiments may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the embodiments.

Further, the memory or memories used in the processing machine that implements the embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the embodiments, a variety of "user interfaces" may be utilized to allow a user to interface with the processing machine or machines that are used to implement the embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method of the embodiments may interact partially with another processing machine or processing machines, while also interacting partially with a human user.

It will be readily understood by those persons skilled in the art that the present embodiments are susceptible to broad utility and application. Many embodiments and adaptations other than those herein described, as well as many variations, modifications and equivalent arrangements, will be apparent from or reasonably suggested by the present embodiments and foregoing description thereof, without departing from the substance or scope of the invention.

Accordingly, while the present exemplary embodiments have been described here in detail, it is to be understood that this disclosure is only illustrative and exemplary and is made to provide an enabling disclosure of the invention. Accordingly, the foregoing disclosure is not intended to be construed or to limit the present embodiments or otherwise to exclude any other such embodiments, adaptations, variations, modifications or equivalent arrangements.

What is claimed is:

1. A method for multi-tenant and omni-channel routing, comprising:
   a multi-tenant and omni-channel routing computer program executed by an information processing apparatus comprising at least one computer processor receiving, from a first chat-based platform in a multi-tenant system, a call to transfer an interaction between the first chat-based platform and a third party to a second voice-based platform in the multi-tenant system;
   the multi-tenant and omni-channel routing computer program collecting a context of the interaction from the first chat-based platform;
   the multi-tenant and omni-channel routing computer program identifying the second voice-based platform based on the context of the interaction; and
   the multi-tenant and omni-channel routing computer program routing the interaction to the second voice-based platform and communicating the context to the second voice-based platform.

2. The method of claim 1, wherein the first chat-based platform provides the interaction over a first communication channel, and the second voice-based platform provides the context over a second communication channel.

3. The method of claim 1, wherein the third party is a customer.

4. The method of claim 1, wherein the second voice-based platform is an interactive voice response (IVR) platform.

5. The method of claim 1, wherein the first chat-based platform and the second voice-based platform have different resources.

6. The method of claim 1, wherein the call comprises a REST call.

7. The method of claim 1, wherein the context comprises at least one of an identification of the third party, third party account information, and a purpose for the interaction.

8. The method of claim 1, wherein the context is collected in an open format.

9. The method of claim 1, further comprising pre-populating desktop screen associated with the second voice-based platform with at least some of the context.

10. A system for multi-tenant and omni-channel routing, comprising:
    a multi-tenant system comprising a plurality of platforms for hosting interactions with third parties; and
    a multi-tenant and omni-channel routing computer program executed by an information processing apparatus comprising at least one computer processor;
    wherein:
    the multi-tenant and omni-channel routing computer program receives from a first chat-based platform, a call to transfer an interaction between the first chat-based platform and a third party to a second voice-based platform in the multi-tenant system;
    the multi-tenant and omni-channel routing computer program collects a context of the interaction from the first chat-based platform;
    the multi-tenant and omni-channel routing computer program identifies the second voice-based platform based on the context of the interaction; and
    the multi-tenant and omni-channel routing computer program routes the interaction to the second voice-based platform and communicates the context to the second voice-based platform.

11. The system of claim 10, wherein the first chat-based platform provides the interaction over a first communication channel, and the second voice-based platform provides the context over a second communication channel.

12. The system of claim 10, wherein the third party is a customer.

13. The system of claim 10, wherein the second voice-based platform is an interactive voice response (IVR) platform.

14. The system of claim 10, wherein the first chat-based platform and the second voice-based platform have different resources.

15. The system of claim 10, wherein the call comprises a REST call.

16. The system of claim 10, wherein the context comprises at least one of an identification of the third party, third party account information, and a purpose for the interaction.

17. The system of claim 10, wherein the context is collected in an open format.

18. The system of claim 10, wherein the multi-tenant and omni-channel routing computer program pre-populates a desktop screen associated with the second voice-based platform with at least some of the context.

* * * * *